A. GRIFFITH.
HOSE COUPLING.
APPLICATION FILED APR. 12, 1915.

1,229,067.

Patented June 5, 1917.

WITNESSES:

INVENTOR.
BY
ATTORNEY

UNITED STATES PATENT OFFICE.

ALLIE GRIFFITH, OF CLEVELAND, OHIO.

HOSE-COUPLING.

1,229,067.

Specification of Letters Patent.

Patented June 5, 1917.

Application filed April 12, 1915. Serial No. 20,748.

*To all whom it may concern:*

Be it known that I, ALLIE GRIFFITH, a citizen of the United States, and resident of Cleveland, in the county of Cuyahoga and State of Ohio, have invented certain new and useful Improvements in Hose-Couplings, of which I hereby declare the following to be a full, clear, and exact description, such as will enable others skilled in the art to which it appertains to make and use the same.

The objects of the invention are to provide a practical and efficient means for quickly attaching and detaching a hose pipe to a house or street connection, which is adaptable for use with hose of all diameters, and which will provide a water tight joint therefor.

The invention includes a suitable air tight socket connection for the separable parts attached respectively to the hose and street connections, and also includes retaining members upon one portion which interlock with complementary members upon the other portion, and are operated by means of a common lever and oppositely placed cams to engage with said complementary members, when the lever is moved in one direction, said lever automatically permitting the release of said retaining members, when moved in another direction.

The invention includes means preventing the involuntary release of the retaining members, when in the interlocking and engaging positions.

The invention further includes the combination and arrangements of parts and construction of details hereinafter described, shown in the accompanying drawings and specifically pointed out in the claims.

Figure 1:
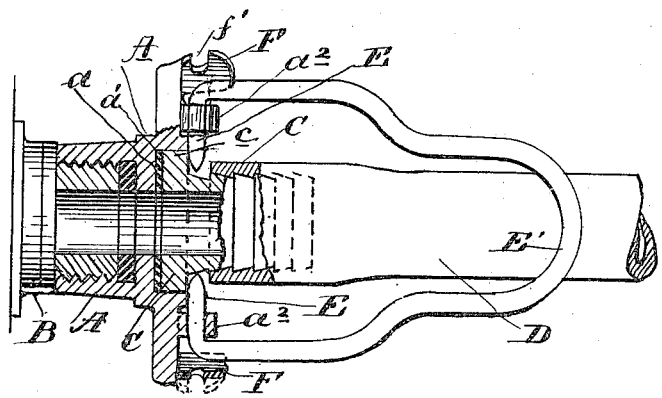
Figure 2:
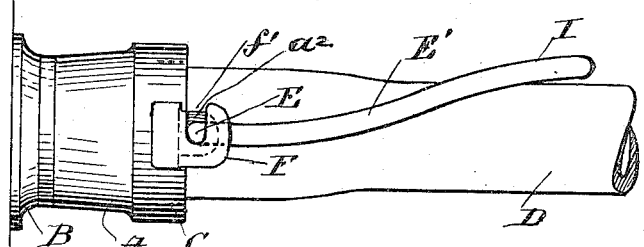
Figure 3:
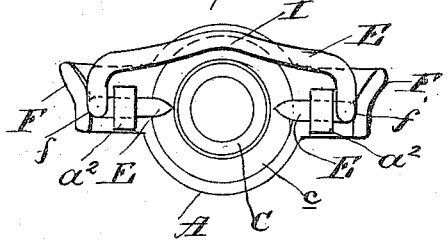

In the accompanying drawings Figure 1 is a plan of the device partly in section; Fig. 2 is a side elevation thereof; Fig. 3 is an end elevation of the cam bearing portion of the coupling, which is attached to the fixed connection.

In these views A is the portion of the coupling to which the fixed house or street connection B is attached, C is the portion of the coupling to which the hose D is attached.

The portion A is provided with the recess or socket $a$ provided with a gasket or soft rubber washer $a'$ in its seat and an annular projection $c$ upon the hose connection C is adapted to fit within this recess.

Upon the wall of the socket A are diametrically positioned ears or perforated lugs $a^2$, $a^2$, upon each side of the recess, and pointed or tapering keepers E, E, are inserted therein and are long enough when projected inwardly to pass over the outer face of the annular projection or flange $c$ upon the hose connection and compress the same upon the gasket $a'$ to secure the two portions together and to make a water tight connection between them.

To provide means for operating these keepers simultaneously to engage with and disengage the flange $c$, the two keepers are connected by means of an integral spring loop E' which can be swung upon the lugs $a^2$, $a^2$, as upon bearings and exterior to the outer ends of the keepers are positioned inclined cams F, F, of such a shape as to engage and force inward the keepers when the loop is moved in one direction and to permit them to separate by means of the spring action of the loop when the loop is moved in the opposite direction, and release the flange $c$.

The cams are provided with a straight or somewhat recessed portion $f$, $f$ which retains the loop in place when the keepers are interlocked with the flange $c$, and are also provided with open slots $f'$, $f'$ through which the sides of the loop can enter when assembling the parts.

The center of the loop is preferably raised at I to prevent interference with the hose.

The device is simple, inexpensive and can be quickly operated by inexperienced persons. It is also extremely efficient and durable in use.

Having described the invention what I claim as new and desire to secure by Letters Patent is:

1. A hose coupling comprising a pair of independent coupling sections, lock means carried by one of said sections movable into and out of engagement with the other of said sections, a lever operable to actuate said lock means, and means disposed in the path of said lever, said means causing said lever to move said lock means, as and for the purpose set forth.

2. A coupling comprising two independent coupling sections, a locking member, an operating lever for said member, and means carried by one of said sections, said means being disposed in the path of movement of said lever to automatically actuate the said locking member, as and for the purpose set forth.

3. A coupling comprising two independent sections, a pair of locking members, a single operating lever having connection with each locking member, means formed upon one of said sections, the said means being disposed in the path of the said operating member, to simultaneously actuate said locking members, as and for the purpose set forth.

4. In a hose coupling, the combination with two separable portions, one having a recess and the other a head insertible therein, of oppositely positioned keepers upon said socket portion, bearings in which said keepers are mounted and in which they are rotatable and radially movable, a spring loop connecting said keepers, and serving as a means for rotating the same, and cams engaged by said loop and operating to force said keepers into engagement with said head, when said loop is revolved in one direction, the spring action of said loop serving to separate said keepers when revolved in the opposite direction.

5. In a hose coupling, in combination, two separable portions for hose and fixed connection respectively, one portion having a head and the other portion a recess therefor, radially movable keepers mounted upon the socket portion and engageable with said head, and rotatable upon said socket portion, a spring loop connecting said keepers, and serving as a lever to operate the same and cams mounted upon said socket portion, and engageable by said loop, said cams serving to force said keepers into engagement with said head, said cams provided with rest portions preventing involuntary movement of said loop.

In testimony whereof, I hereunto set my hand this 31st day of March, 1915.

MRS. ALLIE GRIFFITH.

In presence of—
WM. J. KLOTZBACH,
JAMES E. NOBLE.

Copies of this patent may be obtained for five cents each, by addressing the "Commissioner of Patents, Washington, D. C."